United States Patent [19]

Sanvito

[11] 4,240,126
[45] Dec. 16, 1980

[54] ELECTRIC CAPACITOR CONSTRUCTED TO PREVENT EXPLOSION

[75] Inventor: Enrico Sanvito, Monza, Italy

[73] Assignee: ICAR Industria Condensatori Applicazioni Elettroelettroniche S.p.A., Milan, Italy

[21] Appl. No.: 12,815

[22] Filed: Feb. 16, 1979

[51] Int. Cl.³ .............................................. H01G 1/11
[52] U.S. Cl. .................................... 361/274; 361/275; 361/306
[58] Field of Search .................. 361/275, 274, 15, 306

[56] References Cited
FOREIGN PATENT DOCUMENTS

| 667307 | 7/1963 | Canada | 361/275 |
| 2257135 | 8/1975 | France | 361/275 |

*Primary Examiner*—E. A. Goldberg
*Attorney, Agent, or Firm*—Holman & Stern

[57] ABSTRACT

This disclosure relates to an explosion protection device for a capacitor with a metal casing. According to the invention, an electrical capacitor comprises an intermediate member located above the plates within a cup casing, which is closed upperly by a cover carrying terminals electrically connected to the plates and is axially deformable in a region between the intermediate member and the cover by the action of internal pressure. The intermediate member comprises a peripheral annular portion, from which two appendices project towards the center. Said appendices carry conductors, which are caused to rest resiliently against the inner end of the terminals when the casing is undeformed and are separated therefrom when the casing is deformed.

6 Claims, 4 Drawing Figures

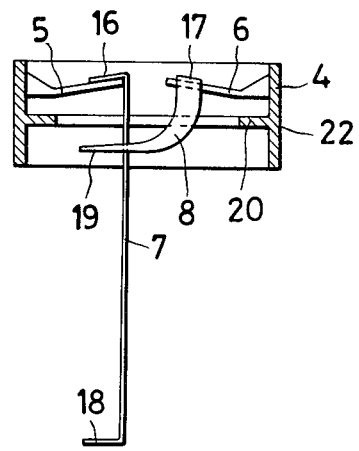
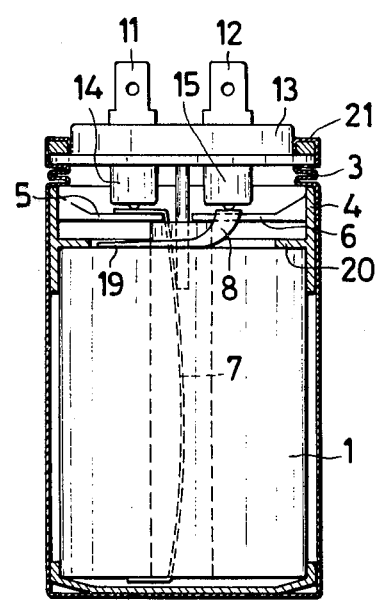
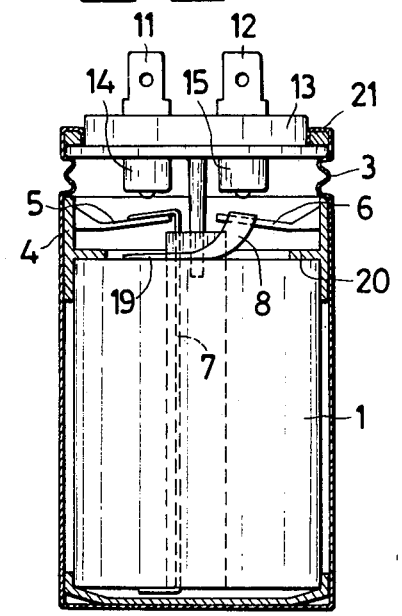

ELECTRIC CAPACITOR CONSTRUCTED TO PREVENT EXPLOSION

Fixed electrical capacitors of the so-called self-regenerable type are essentially constituted, in their well known technical form, by two conducting plates between which is disposed a dielectric formed from one or more sheets of insulating material. The plates are formed from a thin metal layer deposited on the said dielectric by vacuum evaporation. The dielectric sheets are wound to form a capacitive element of cylindrical shape with a generally circular cross-section. The dielectric can be constituted by sheets of paper or plastics material such as polypropylene, polycarbonate, polyester, polystyrol etc. Molten metal is sprayed on to the ends of the capacitive element to create on each of them a metal layer which is electrically in contact with one plate.

In one type widely used in practice, the capacitive element is contained in a cylindrical metal casing which is closed hermetically by a cover. The cover is traversed by two through terminals electrically connected to the plates by suitable connections.

The interspace between the capacitive element and the casing can be filled either totally or partially with an insulating fluid.

It is a known fact that these self-regenerable capacitors when supplied with alternating or direct current can lead to the production of an internal pressure if a fault develops, and this can cause the casing to explode.

The fault in the capacitor can be caused by a voltage stress or a temperature which exceed the allowable values, or by a constructional defect, or again by the normal failure of the dielectric at the end of the scheduled life of the capacitor.

To prevent this increase in internal pressure from causing the casing to explode, it is usual to provide the capacitor with a protection system such that when the internal pressure reaches a predetermined value, the electrical circuit of the capacitor becomes automatically interrupted. This prevents the possibility of further increase in pressure, with consequent explosion.

To this end, the upper portion of the casing of such capacitors is given an undulated profile, so that when a certain pressure is reached, the casing is made to extend by the stretching of the undulated portion. This extension of the casing is utilized to interrupt the internal electrical circuit of the capacitor. It has been proposed to use wires with a weakened section, thin silver wires, or different types of insertion connectors etc. as the interruption member for the electrical circuit.

These known constructions give rise to various problems relating both to uncertainties of operation and to uncertainties of construction because of the difficulty of assembling the product, or because of the relative complexity and cost of the components used for interrupting the circuit.

In general, the use of the presently known interruption members makes the construction particularly critical and thus costly. In particular, the wires used as interruption members are very delicate, and their tensioning during assembly must be carried out very carefully. The other insertion systems imply very small tolerances, because generally the electrical contact is effective only in a relative determined position of the two parts of the insertion connector.

The object of the invention is to obviate the problems and disadvantages of the known technology, by proposing a capacitor structure which ensures interruption of the electrical circuit if a dangerous pressure is reached inside the casing, and is of simple construction with regard both to its component parts and its assembly, with a view to its production by automatic or semi-automatic lines.

To this end, the invention provides an electrical capacitor of the type in which the plates with the dielectric disposed therebetween are contained in a cup casing which is axially deformable by the action of internal pressure, and is closed upperly by a cover carrying terminals electrically connected to the plates, wherein above the plates there is disposed a member comprising a peripheral annular portion which lies around the inside of the casing and from which two appendices carrying conductors connected to the plates project towards the centre, the appendices causing the conductors to rest resiliently against the inner end of the terminals when the casing is undeformed, the casing being deformable in the region between the intermediate member and the cover, to withdraw the inner end of the terminals from the conductors.

The objects and essential characteristics of the invention will be more apparent from the description given hereinafter by way of example of one embodiment, illustrated in the accompanying drawings in which:

FIG. 2 is a diametrical sectional view of a detail of the capacitor of FIG. 1;

FIGS. 3 and 4 are two diametrical sectional views of the capacitor in two different operating positions.

Figure 1:
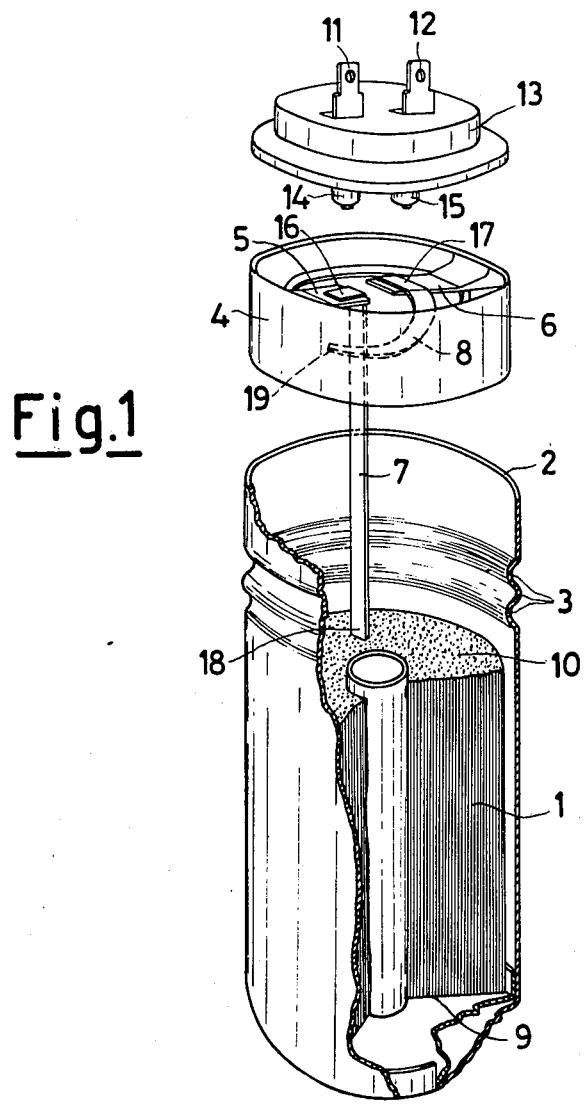
FIG. 1 is an exploded perspective view of a capacitor according to the invention.

In the illustrated capacitor according to the present invention, the capacitive element 1, constituted by plates separated by dielectric, is inserted into the metal casing 2, the portion 3 of which is of undulated profile to allow elongation in the case of excessive internal pressure.

In FIG. 1, the undulation of the portion 3 of the casing is shown only slight, but in fact becomes completely squashed during the flanging operation which will be described hereinafter.

The member 4, which has an essential function in the invention, possesses two resilient appendices 5 and 6. These appendices are designed to support the end part 16 and 17 of the strips 7 and 8 which electrically connect the metal ends 9 and 10 of the element 1 to the terminals 11 and 12 respectively.

The material of construction of the member 4 can be insulating or metal. It can also be constructed by assembling various parts, and in this case can be partly of metal and partly insulating.

In particular, the resilient appendices 5 and 6 can be of plastics, or of metal possessing a certain resilience such as steel, phosphor bronze etc. If the appendices 5 and 6 form one piece with the member 4 and the piece is of metal, it is necessary to provide suitable insulation between the appendices 5 and 6 and the strips 7 and 8.

The capacitor terminals 11 and 12 pass through the insulating cover 13 and comprise two metal extensions 14 and 15 respectively, which are suitable shaped to provide an electrical pressure contact with the end part 16 and 17 of the strips 7 and 8.

For greater clarity, FIG. 2 shows the member 4 with the two resilient appendices 5 and 6, and the contact strips 7 and 8 in position with their ends 16 and 17 being retained by the resilient appendices 5 and 6. As already stated, the other two ends 18 and 19 of the strips 7 and 8 are connected to the metal ends 9 and 10 respectively of the capacitive element (FIG. 1).

From FIG. 2 it can be seen that the two resilient appendices 5 and 6 of the member 4 are inclined upwards when in their rest position. This inclination is completely or partly taken up during assembly of the capacitor. The consequent deformation leads to electrical contact under pressure between the end part 16 and 17 of the strips 7 and 8 and the lower part of the through terminals 11 and 12 (FIG. 1). From FIG. 2 it can also be seen that the member 4 is provided with a rim 20 designed to rest on the capacitive element to provide the reaction force exerted by the terminals on the resilient appendices 5 and 6.

The ring 22 can also be used to keep the element centred in the casing. If this ring is of insulating material, it can also provide the insulation between the capacitive element and the casing.

FIG. 3 is a cross-section through the mounted capacitor, showing how the member 4 rests by its rim 20 on the capacitive element 1.

In practice, the lower part 14 and 15 of the terminals 11 and 12 becomes compressed on to the ends of the strips 7 and 8 supported by the resilient appendices 5 and 6 during the operation involving the closure of the capacitor, which is carried out by forming a flange 21 on the edge of the cover 13 by a known method.

It is not absolutely essential to carry out this flanging operation on a capacitor provided with the device according to the invention. In this respect, it is sufficient to size the two resilient appendices 5 and 6 such that a displacement-pressure condition exists which allows a substantial tolerance in the axial positioning of the components; while always maintaining sufficient pressure at the electrical contact between the strips 7 and 8 and the lower part 14 and 15 of the through terminals 11 and 12.

This pressure must be sufficient to form an electrical contact which can be traversed by the capacitor current without any difficulties arising, either when it is supplied with alternating current or when under charge and discharge current if it is supplied with direct current.

FIG. 4 is a cross-sectional view of the capacitor after the explosion protection device has operated, due to the high internal pressure generated by a fault. It can in fact be seen that the casing has become elongated because of the stretching of the undulated profile 3 of the casing. The terminals 11 and 12 have thus been raised, and the contact between their lower part 14 and 15 and the strips 7 and 8 has been broken. The resilient appendices 5 and 6 have regained their rest position, and the electrical circuit of the capacitor is interrupted at two points. The fact that the electrical circuit has become interrupted at two different points is an advantage in terms of the operational reliability of the explosion protection device. This advantage is generally not shared by capacitors which use a wire as the interruption member.

The description has referred in particular to capacitors of the self-regenerable type, i.e. with metallised plates, in that these generally require special arrangements to be made in order to prevent the casing exploding. In practice there are capacitors not of the self-regenerable type, i.e. with their plates constituted by a metal sheet, which are of the same mechanical construction as the self-regenerable capacitors. Sometimes these capacitors also require an explosion protection device, as in the case of the self-regenerable capacitors. The device according to the present invention is also applicable to such capacitors not of the self-regenerable type, without substantial structural modifications.

What is claimed is:

1. An electrical capacitor comprising:
   a generally cup-shaped casing;
   a plurality of capacitor plates having dielectric material therebetween disposed in said casing, said plates forming a plate assembly having opposite ends;
   an annular member disposed in said casing above said capacitor plate plate assembly and having a peripheral wall which abuts the casing along the peripheral length of said wall;
   first and second resilient support members projecting generally radially inward from said peripheral wall of said annular member, said members being resiliently moveable toward said capacitor plate assembly;
   first and second conductors supported by said first and second support members, respectively, in contact with respective ends of said capacitor plate assembly;
   a cover closing the upper end of said housing above said annular member;
   first and second terminals supported by said cover in pressure contact with said first and second conductors, respectively, to urge the conductors toward the capacitor plate assembly by resiliently bending said resilient support members; and
   axially deformable wall section means forming a part of said housing disposed between said cover and said annular member for elongated said part of said housing in response to internal pressurization in said housing, the resulting elongation being sufficient to move said cover away from said annular member and remove said terminals from contact with said conductors.

2. A capacitor as claimed in claim 1, wherein said annular member is constructed of relatively resilient insulating material, and wherein said support members are in one piece with the peripheral wall.

3. A capacitor as claimed in claim 2, wherein said conductors are of strip configuration, at least in the portion supported by the support members, where they are in contact with the terminals.

4. A capacitor as claimed in claim 1, wherein said peripheral wall is of thin walled cylindrical configuration having one rim disposed between the casing and said plate assembly, in order to keep the plate assembly centred in, and separated from the casing.

5. A capacitor as claimed in claim 1, wherein said wall section of said casing is a circumferential inwardly directed deformation of the casing abutting against said annular to inhibit axial movement of the annular members.

6. A capacitor as claimed in claim 4, wherein said annular member comprises an inner radial rim which rests axially on the plates.

* * * * *